(12) United States Patent
Kawai et al.

(10) Patent No.: US 11,783,063 B2
(45) Date of Patent: Oct. 10, 2023

(54) CONTROL DEVICE

(71) Applicant: OMRON Corporation, Kyoto (JP)

(72) Inventors: Ko Kawai, Kusatsu (JP); Takahiro Toku, Kusatsu (JP)

(73) Assignee: OMRON Corporation, Kyoto (JP)

(*) Notice: Subject to any disclaimer, the term of this patent is extended or adjusted under 35 U.S.C. 154(b) by 278 days.

(21) Appl. No.: 17/279,086

(22) PCT Filed: Oct. 8, 2019

(86) PCT No.: PCT/JP2019/039605
§ 371 (c)(1),
(2) Date: Mar. 23, 2021

(87) PCT Pub. No.: WO2020/085078
PCT Pub. Date: Apr. 30, 2020

(65) Prior Publication Data
US 2021/0390194 A1 Dec. 16, 2021

(30) Foreign Application Priority Data
Oct. 24, 2018 (JP) .................... 2018-199726

(51) Int. Cl.
*G06F 21/62* (2013.01)
*G05B 23/02* (2006.01)
*H04L 9/08* (2006.01)

(52) U.S. Cl.
CPC ..... *G06F 21/6209* (2013.01); *G05B 23/0254* (2013.01); *G05B 23/0283* (2013.01); *H04L 9/0825* (2013.01); *H04L 9/0863* (2013.01)

(58) Field of Classification Search
CPC . G06F 21/6209; H04L 9/0825; H04L 9/0863; G05B 23/0283
See application file for complete search history.

(56) References Cited

U.S. PATENT DOCUMENTS 10,621,373 B2 * 4/2020 Iwai ............... H04W 12/30
2010/0122091 A1 * 5/2010 Huang ............. H04L 9/3226
713/171

(Continued)

FOREIGN PATENT DOCUMENTS

JP 2000059357 2/2000
JP 2002055667 2/2002

(Continued)

OTHER PUBLICATIONS

Dimitrios Sisiaridis et al., "Reducing Data Complexity in Feature Extraction and Feature Selection for Big Data Security Analytics", 2018 1st International Conference on Data Intelligence and Security (ICDIS), Apr. 2018, pp. 43-48.

(Continued)

*Primary Examiner* — Thaddeus J Plecha
(74) *Attorney, Agent, or Firm* — JCIPRNET

(57) ABSTRACT

A control device includes: a feature extraction unit that calculates one or more feature amounts from one or more state values; a processing unit that calculates a score based on the one or plurality of feature amounts calculated by the feature extraction unit with reference to a learning model; a determination unit that generates a determination result indicating whether any abnormality has occurred in a monitoring target based on the score; a first data storage unit that stores at least one of data related to processing in the feature extraction unit and data related to processing in the processing unit; a second data storage unit that stores an arbitrary state value capable of being referred to by the control device; and an authority management unit that restricts access to the first data storage unit.

15 Claims, 10 Drawing Sheets

(56) References Cited

U.S. PATENT DOCUMENTS

| | | | | |
|---|---|---|---|---|
| 2011/0197077 | A1* | 8/2011 | Chan | G06F 21/10 |
| | | | | 713/189 |
| 2013/0179005 | A1* | 7/2013 | Nishimoto | B60R 25/1001 |
| | | | | 701/2 |
| 2017/0308909 | A1* | 10/2017 | Faith | G06Q 50/01 |
| 2017/0314961 | A1* | 11/2017 | Chen | G06F 18/2135 |
| 2018/0167402 | A1 | 6/2018 | Scheidler et al. | |
| 2019/0099886 | A1* | 4/2019 | Chattopadhyay | G05B 23/024 |
| 2021/0224599 | A1* | 7/2021 | Tajima | G05B 23/024 |

FOREIGN PATENT DOCUMENTS

| | | |
|---|---|---|
| JP | 2003244124 | 8/2003 |
| JP | 2005154688 | 6/2005 |
| JP | 2007280348 | 10/2007 |
| JP | 2015184849 | 10/2015 |
| JP | 2016528610 | 9/2016 |
| JP | 2018033953 | 2/2018 |
| JP | 2018097662 | 6/2018 |
| JP | 2018159981 | 10/2018 |
| WO | 2018087851 | 5/2018 |
| WO | 2018110259 | 6/2018 |

OTHER PUBLICATIONS

Qiang Liu et al., "A Survey on Security Threats and Defensive Techniques of Machine Learning: A Data Driven View", IEEE Access, vol. 6, Mar. 2018, pp. 12103-12117.

"Search Report of Europe Counterpart Application", dated Jun. 10, 2022, pp. 1-10.

Masashi Une et al., "Research Trends on Vulnerability and Countermeasures in Machine Learning Systems," with English Abstract, Computer Security Symposium 2018, Oct. 2018, pp. 1-8.

Nathan Dowlin et al., "CryptoNets: Applying Neural Networks to Encrypted Data with High Throughput and Accuracy," ICML'16: Proceedings of the 33rd International Conference on International Conference on Machine Learning, vol. 48, Jun. 2016, pp. 201-210.

Le Trieu Phong et al., "Privacy-Preserving Deep Learning via Additively Homomorphic Encryption," IEEE Transactions on Information Forensics and Security, vol. 13, May 2018, pp. 1-18.

"Office Action of Japan Counterpart Application" with English translation thereof, dated Nov. 9, 2021, p. 1-p. 10.

"International Search Report (Form PCT/ISA/210) of PCT/JP2019/039605", dated Dec. 24, 2019, pp. 1-4.

"Written Opinion of the International Searching Authority (Form PCT/ISA/237) of PCT/ JP2019/039605", dated Dec. 24, 2019, pp. 1-8.

* cited by examiner (a)

| index | time stamp | frame ID | feature amount 1 | feature amount 2 | ... | feature amount M | score |
|---|---|---|---|---|---|---|---|
| 1 | t11 | 1 | feature1_1 | feature2_1 | ... | featureM_1 | score1 |
| 2 | t12 | 2 | feature1_2 | feature2_2 | ... | featureM_2 | score2 |
| 3 | t13 | 3 | feature1_3 | feature2_3 | ... | featureM_3 | score3 |
| ... | ... | ... | ... | ... | ... | ... | ... |

(b)

| feature amount 1 | device variable p | average value |
|---|---|---|
| feature amount 2 | device variable q | maximum value |
| feature amount 3 | device variable r | minimum value |
| ... | ... | ... |

FIG.8

| index | time stamp | device variable 1 | device variable 2 | ... | device variable N |
|---|---|---|---|---|---|
| 1 | t1 | value1_1 | value2_1 | ... | valueN_1 |
| 2 | t2 | value1_2 | value2_2 | | valueN_2 |
| 3 | t3 | value1_3 | value2_3 | ... | valueN_3 |
| ... | ... | ... | ... | | ... |

FIG.9

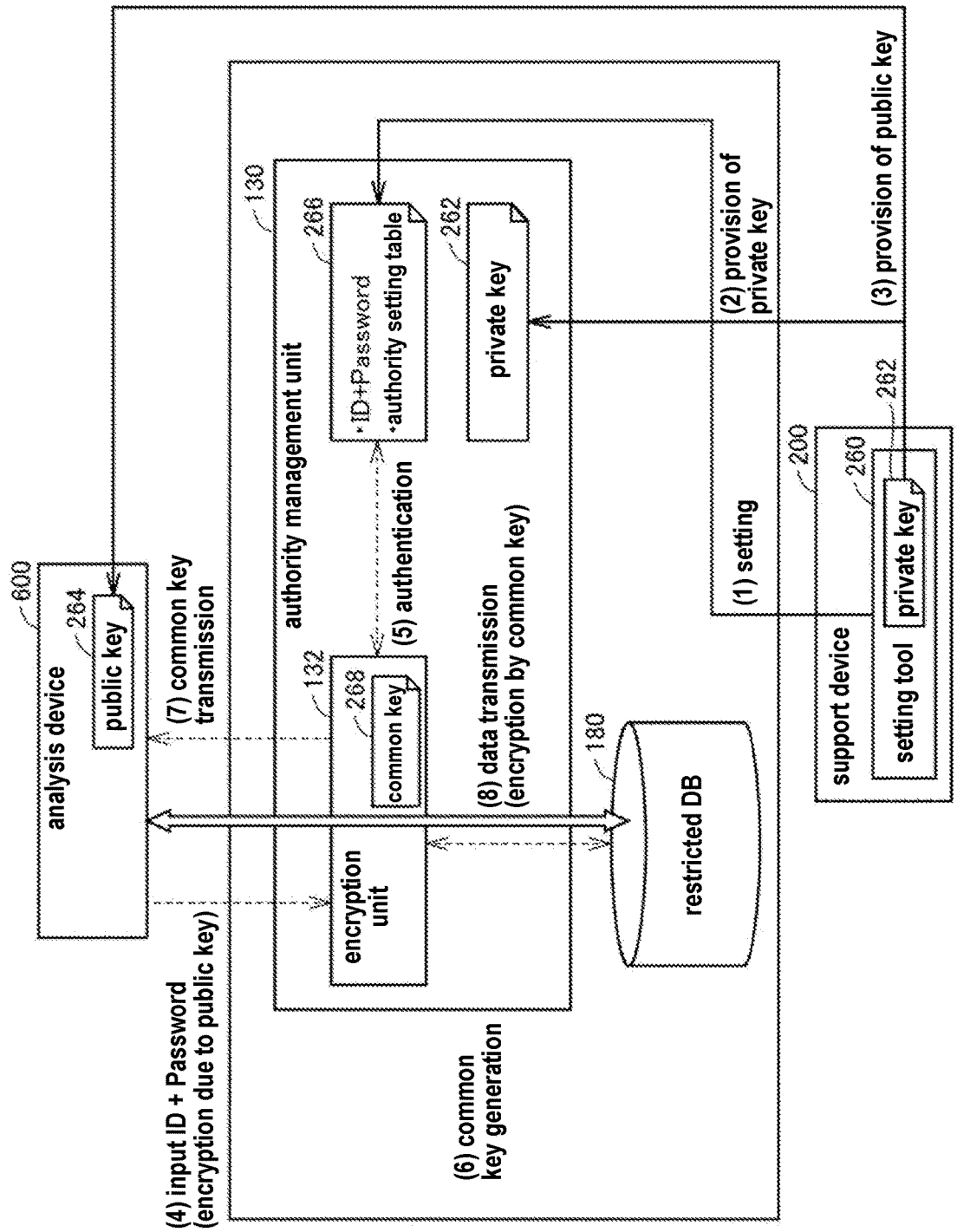

CONTROL DEVICE

CROSS-REFERENCE TO RELATED APPLICATION

This application is a 371 application of the International PCT application serial no. PCT/JP2019/039605, filed on Oct. 8, 2019, which claims the priority benefit of Japanese Patent Application No. 2018-199726, filed on Oct. 24, 2018. The entirety of each of the above-mentioned patent applications is hereby incorporated by reference herein and made a part of this specification.

BACKGROUND

Technical Field

The present invention relates to a control device capable of detecting any abnormality that may occur in a monitoring target.

Related Art

At various production sites, there is a need to improve equipment utilization rate by predictive maintenance of a machine or a device. Predictive maintenance means a maintenance mode in which a maintenance work such as a reparation or a replacement is performed before the equipment is put into a stopped state, by detecting any abnormality occurring in the machine or device.

In order to realize the predictive maintenance, it is necessary to collect state values of the machine and device and to determine whether any abnormality has occurred in the machines or devices, based on the collected state values.

On the other hand, the content, such as which state value is collected to realize abnormality detection or what kind of algorithm of abnormality detection is adopted is, so to speak, know-how, and there is a need to conceal the content.

When the abnormality detection processing is implemented in a control device such as a PLC (programmable controller), for example, a necessary program is described using a PLC programming language defined in IEC 61131-3. It is possible to prohibit access to the program itself in the control device using a limiting technique as disclosed in Japanese Patent Laid-open No. 2007-280348 (Patent Literature 1) and Japanese Patent Laid-open No. 2005-154688 (Patent Literature 2).

LITERATURE OF RELATED ART

Patent Literature

Patent Literature 1: Japanese Patent Application Laid-open No. 2007-280348
Patent Literature 2: Japanese Patent Application Laid-open No. 2005-154688

SUMMARY

Problems to be Solved

However, in order to protect the know-how related to abnormality detection processing, it is necessary to conceal not only the program but also the data during processing. The above-mentioned Patent Literatures 1 and 2 do not consider such a new problem at all. Therefore, the above-mentioned Patent Literatures 1 and 2 only protect the program itself in the control device, but cannot protect the data during processing.

An object of the present invention is to provide a mechanism capable of appropriately protecting know-how related to abnormality detection processing.

Means to Solve Problems

A control device that controls a control target according to an example of the present invention includes: a feature extraction unit which calculates one or a plurality of feature amounts from one or a plurality of state values acquired from a monitoring target; a processing unit which calculates a score which is a value indicating a possibility that any abnormality has occurred in the monitoring target, based on the one or the plurality of feature amounts calculated by the feature extraction unit, with reference to a learning model; a determination unit which generates a determination result indicating whether any abnormality has occurred in the monitoring target, based on the score calculated by the processing unit; a first data storage unit which stores at least one of data related to processing in the feature extraction unit and data related to processing in the processing unit; a second data storage unit which stores an arbitrary state value capable of being referred to by the control device; and an authority management unit which restricts access to the first data storage unit.

According to this configuration, data related to the processing in the feature extraction unit and data related to the processing in the processing unit, regarding the know-how related to the abnormality detection processing, are stored in the first data storage unit in which access is restricted by the authority management unit. On the other hand, since any state value that can be referred to by the control device is stored in the second data storage unit, it is possible to easily confirm the validity.

The data related to the processing in the feature extraction unit may include the one or the plurality of feature amounts calculated by the feature extraction unit. According to this configuration, it is possible to appropriately conceal the feature amounts calculated by the feature extraction unit, which is one of the know-how related to the abnormality detection processing.

The feature extraction unit may calculate the one or plurality of feature amounts from one or a plurality of state values specified by setting information from outside, and the data related to the processing in the feature extraction unit may include the setting information. According to this configuration, it is possible to appropriately conceal the setting information, which is one of the know-how related to abnormality detection processing.

The data related to the processing in the processing unit may include the score calculated by the processing unit. According to this configuration, it is possible to appropriately conceal the score calculated by the processing unit, which is one of the know-how related to the abnormality detection processing.

The authority management unit may restrict the access to programs for realizing the feature extraction unit and the processing unit. According to this configuration, since it is possible to protect not only the input to the feature extraction unit and the processing unit or the output from the feature extraction unit and the processing unit, but also the feature extraction unit and the processing unit itself, the know-how related to the abnormality detection processing can be appropriately protected.

The second data storage unit may further store the determination result generated by the determination unit. According to this configuration, since the determination result is stored in the second data storage unit in addition to the state value, the ex-post analysis processing can be facilitated.

The authority management unit may determine whether an authority to access the first data storage unit is granted based on identification information and a password. According to this configuration, since a general authority management method can be adopted, a versatility can be enhanced.

The authority management unit may have a private key corresponding to a public key held by an external device that accesses the first data storage unit, and the authority management unit may decrypt the identification information and the password encrypted by the public key transmitted from the external device with the private key, and then determine whether the authority to access the first data storage unit is granted. According to this configuration, it is possible to ensure security for the identification information and the password exchanged between the control device and the external device.

When the authority management unit determines that the authority to access the first data storage unit is granted, the authority management unit may transmit, to the external device, a common key for encrypting data exchanged with the external device. According to this configuration, it is possible to ensure security for the data provided from the control device to the external device.

Effect

According to the present invention, it is possible to provide a mechanism capable of appropriately protecting the know-how related to the abnormality detection processing.

BRIEF DESCRIPTION OF THE DRAWINGS

FIG. 8 is a schematic diagram showing an example of data stored in the restricted DB of the control device shown in FIG. 7.

FIG. 9 is a schematic diagram showing an example of data stored in a public DB of the control device shown in FIG. 7.

FIG. 10 is a block diagram showing an implementation example for restricting access to a restricted DB in the abnormality detection system 1 according to the present embodiment.

DESCRIPTION OF THE EMBODIMENTS

Figure 1:
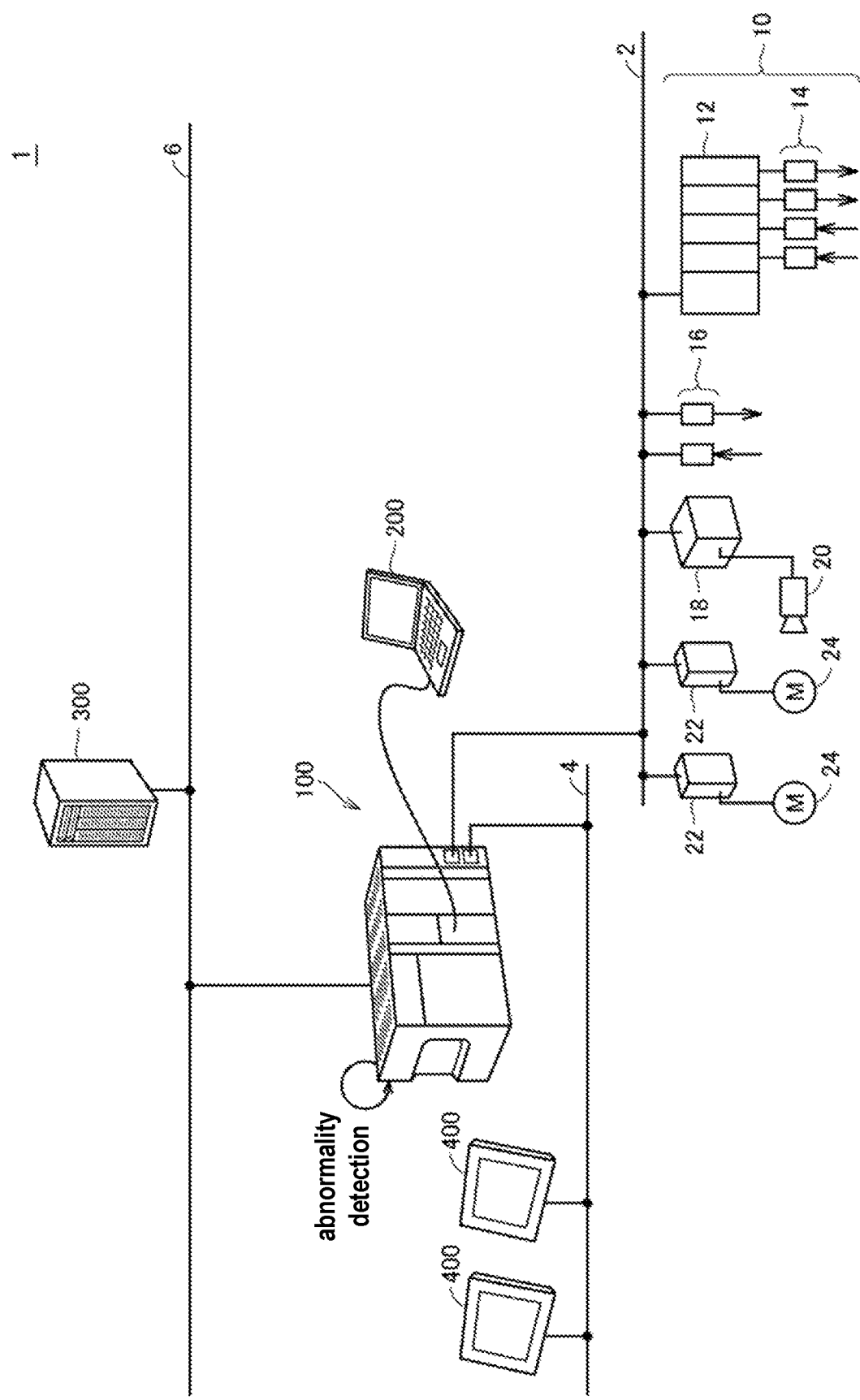
FIG. 1 is a schematic diagram showing an overall configuration example of an abnormality detection system according to the present embodiment.

An embodiment of the present invention will be described in detail with reference to the drawings. The same or corresponding parts in the drawings are denoted by the same reference numerals and the description thereof will not be repeated.

A. Application Example

First, an example of a situation to which the present invention is applied will be described.

An example of a functional configuration of a control system capable of executing abnormality detection processing according to the present embodiment will be described. In the following description, since the abnormality detection processing of the control system will be mainly described, the entire control system is also referred to as "abnormality detection system".

First, an example of the overall configuration of the abnormality detection system 1 according to the present embodiment will be described.

FIG. 1 is a schematic diagram showing an overall configuration example of the abnormality detection system 1 according to the present embodiment. Referring to FIG. 1, the abnormality detection system 1 includes, as main components, a control device 100 that controls a control target, and a support device 200 that can be connected to the control device 100. The abnormality detection system 1 may further include a host server 300 and a display device 400, as an optional configuration.

The control device 100 generates a determination result indicating whether any abnormality has occurred in a monitoring target included in the control target. The control device 100 may be embodied as a kind of computer, such as a PLC (programmable controller).

More specifically, the control device 100 is connected to a field device group 10 via a first fieldbus 2, and is connected to one or a plurality of display devices 400 via a second fieldbus 4. Further, the control device 100 is connected to the host server 300 via a local network 6. The control device 100 exchanges data with the connected device via each network.

The control device 100 has an abnormality detection function that executes various control calculations for controlling equipment and machines and detects an abnormality that occurs in the control target. By mounting the abnormality detection function on the control device 100, it is possible to detect an abnormality that may occur in the control target in a shorter cycle.

In the present specification, the "state value" is a term including a value that can be observed by an arbitrary control target (or a monitoring target), and may include, for example, a physical value that can be measured by an arbitrary sensor, an ON/OFF state of a relay, a switch, or the like, a command value such as a position, speed, and torque given to the servo driver by the PLC, and a variable value used by the PLC for calculation.

The state value observed by an arbitrary control target and transmitted to the control device 100 is also referred to as "input value" below.

As a first fieldbus 2 and a second fieldbus 4, it is preferable to adopt a network that performs fixed cycle communication in which an arrival time of data is guaranteed. EtherCAT (registered trademark) or the like is known as a network that performs such fixed cycle communication.

The field device group 10 includes a device that collects a state value of the control target or a manufacturing device or a production line related to control (hereinafter, also collectively referred to as "field") as an input value. An input relay, various sensors, and the like are assumed as a device which acquires such a state value. The field device group 10 further includes a device that exerts some action on the field, based on a command value (hereinafter, also referred to as "output value") generated by the control device 100. An output relay, a contactor, a servo driver and a servo motor, and any other actuator are assumed as the device that exerts some action on the field. The field device group 10 exchanges data including input values and output values with the control device 100 via the first fieldbus 2.

In the configuration example shown in FIG. 1, the field device group 10 includes a remote I/O (Input/Output) device 12, a relay group 14, an image sensor 18, a camera 20, a servo driver 22, and a servo motor 24.

The remote I/O device 12 includes a communication unit that communicates via the first fieldbus 2, and an input/output unit (hereinafter, also referred to as "I/O unit") for acquiring an input value and outputting an output value. Input values and output values are exchanged between the control device 100 and the field via such an I/O unit. FIG. 1 shows an example in which digital signals are exchanged as input values and output values via the relay group 14.

The I/O unit may be directly connected to the fieldbus. FIG. 1 shows an example in which the I/O unit 16 is directly connected to the first fieldbus 2.

The image sensor 18 performs image measurement processing such as pattern matching on the image data captured by the camera 20, and transmits the processing result to the control device 100.

The servo driver 22 drives the servo motor 24 according to an output value (for example, a position command or the like) from the control device 100.

As described above, data is exchanged between the control device 100 and the field device group 10 via the first fieldbus 2, and the exchanged data are updated in a very short cycle of several hundreds of microsecond order to several tens of millisecond order. The data update processing of such exchanged data may be referred to as "I/O refresh processing".

The support device 200 is a device that supports the preparation necessary for the control device 100 to control the control target. Specifically, the support device 200 provides a development environment of program (program creation and editing tool, parser, compiler, or the like) executed by the control device 100, a setting environment for setting parameters (configuration) of the control device 100 and various devices connected to the control device 100, a function of transmitting the generated user program to the control device 100, a function of modifying and changing the user program or the like executed on the control device 100 online, and the like.

Further, the support device 200 provides functions such as various settings or data generation and transmission for realizing the abnormality detection processing in the control device 100.

The upper server 300 is connected to the control device 100 via the local network 6 and exchanges necessary data with the control device 100. The upper server 300 has, for example, a database function, and collects various data stored in the control device 100 periodically or on an event basis. A general-purpose protocol such as Ethernet (registered trademark) may be implemented in the local network 6.

The display device 400 is connected to the control device 100 via the second fieldbus 4, receives a manipulation from the user, transmits a command or the like according to the user manipulation to the control device 100, and graphically displays the processing results and the like of the control device 100.

Next, the main part related to the abnormality detection processing and the data storage related to the abnormality detection processing in the abnormality detection system 1 according to the present embodiment will be described.

Figure 2:
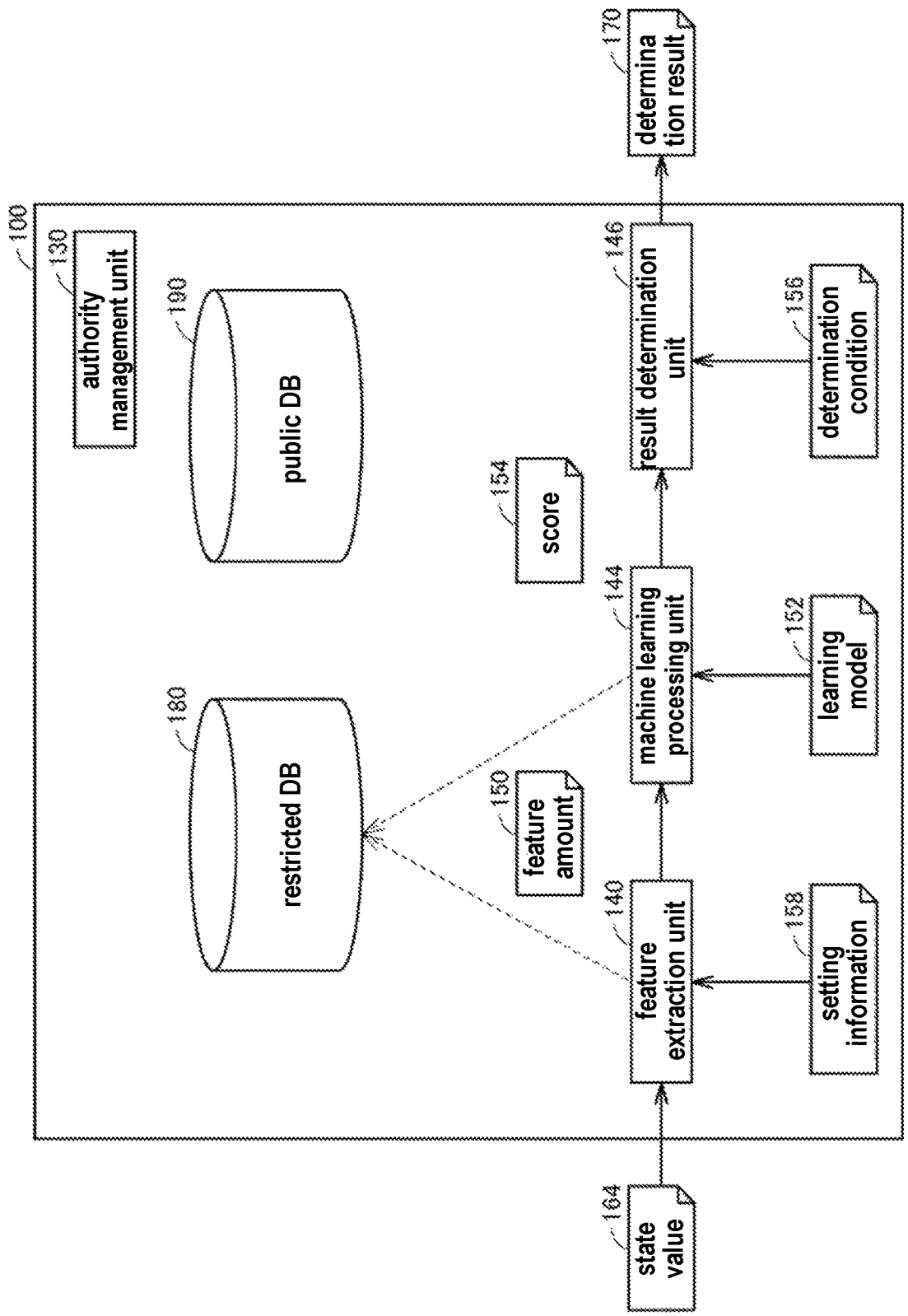
FIG. 2 is a schematic diagram showing a main part of a control device constituting an abnormality detection system according to the present embodiment.

FIG. 2 is a schematic view showing a main part of the control device 100 constituting the abnormality detection system 1 according to the present embodiment. Referring to FIG. 2, the control device 100 includes a feature extraction unit 140, a machine learning processing unit 144, a result determination unit 146, an authority management unit 130, and a restricted database (hereinafter, also abbreviated as "restricted DB") 180, and a public database (hereinafter, also abbreviated as "public DB") 190.

The feature extraction unit 140 calculates one or a plurality of feature amounts 150 from one or a plurality of state values 164 acquired from the monitoring target. At this time, the feature extraction unit 140 calculates the one or the plurality of feature amounts 150 from the one or the plurality of state values 164 designated by the setting information 158 from the outside.

The machine learning processing unit 144 calculates a score 154 which is a value indicating possibility that any abnormality has occurred in the monitoring target, based on the one or the plurality of feature amounts 150 calculated by the feature extraction unit 140, by referring to the learning model 152.

The result determination unit 146 generates a determination result 170 indicating whether any abnormality has occurred in the monitoring target based on the score 154 calculated by the machine learning processing unit 144. At this time, the result determination unit 146 determines whether any abnormality has occurred in the monitoring target, based on the score 154 by referring to the determination condition 156.

The restricted DB 180 corresponds to a data storage unit that stores at least one of the data related to the processing in the feature extraction unit 140 and the data related to the processing in the machine learning processing unit 144. On the other hand, the public DB 190 corresponds to the data storage unit that stores an arbitrary state value that can be referred to by the control device 100. Further, the authority management unit 130 restricts access to the restricted DB 180.

As shown in FIG. 2, in the control device 100 according to the present embodiment, by preparing two types of databases (data storage units) having different access authorities, means for protecting the know-how related to the abnormality detection processing and securing various analysis methods and the like is provided.

B. Hardware Configuration Example

Next, a hardware configuration example of the main devices constituting the abnormality detection system 1 according to the present embodiment will be described.

b1: Hardware Configuration Example of Control Device 100

Figure 3:
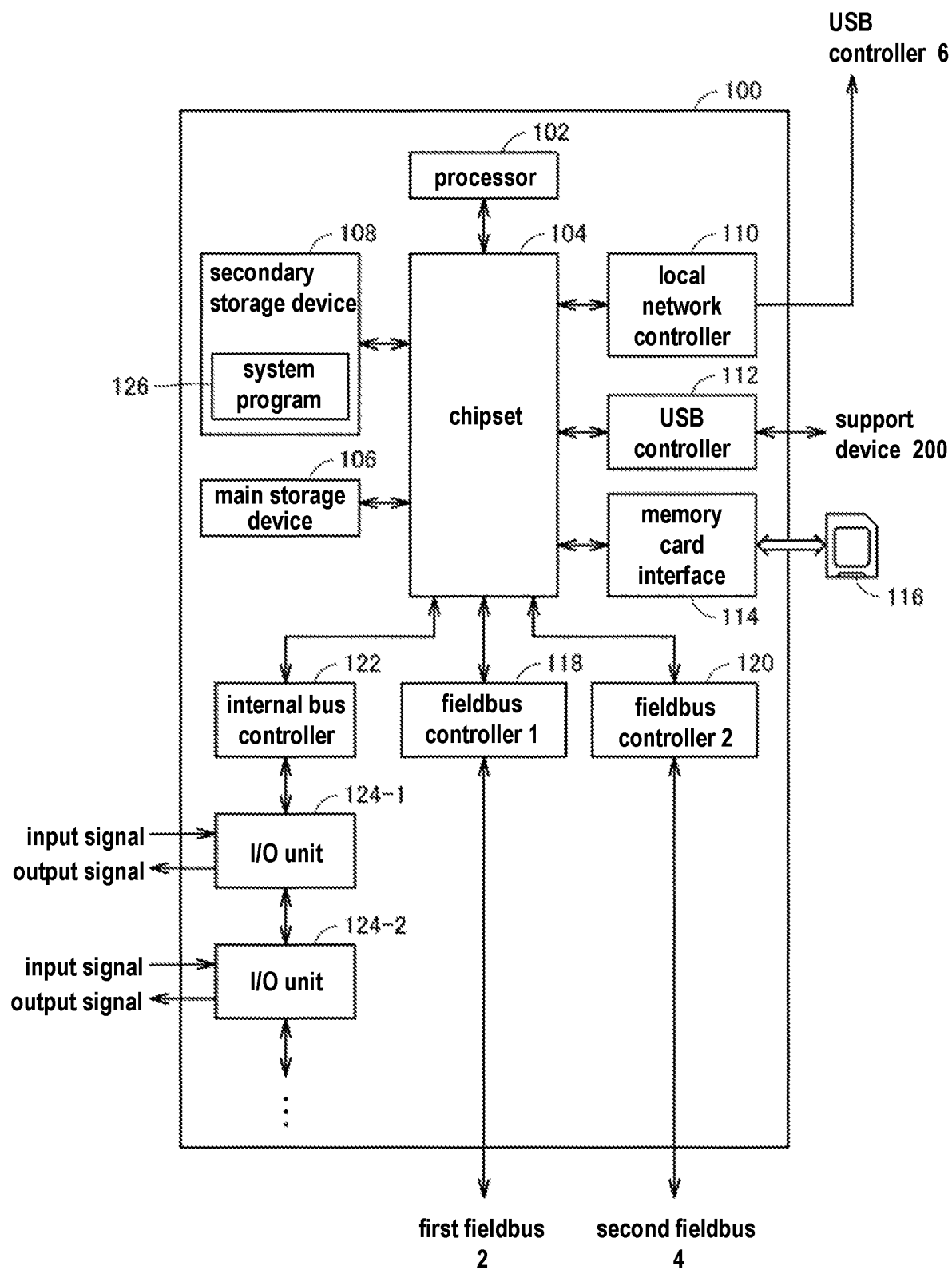
FIG. 3 is a block diagram showing a hardware configuration example of the control device constituting the abnormality detection system according to the present embodiment.

FIG. 3 is a block diagram showing a hardware configuration example of the control device 100 constituting the abnormality detection system 1 according to the present embodiment. With reference to FIG. 3, the control device 100 includes a processor 102 such as a CPU (Central Processing Unit) and an MPU (Micro-Processing Unit), a chip set 104, a main storage device 106, a secondary storage device 108, a local network controller 110, a USB (Universal Serial Bus) controller 112, a memory card interface 114, an internal bus controller 122, fieldbus controllers 118 and 120, and I/O units 124-1, 124-2, . . . .

The processor 102 reads various programs stored in the secondary storage device 108, deploys and executes them in the main storage device 106, thereby realizing control depending on the control target and various processing as described later. The chipset 104, together with the processor 102, controls each component to realize the processing of the control device 100 as a whole.

The secondary storage device 108 stores a user program executed by utilizing the execution environment provided by the system program 126, in addition to the system program 126 (corresponding to the control program) for realizing the function provided by the control device 100.

The local network controller 110 controls the exchange of data with other devices via the local network 6. The USB controller 112 controls the exchange of data with the support device 200 via the USB connection.

The memory card interface 114 is configured so that the memory card 116 can be attached and detached, and is able to write data to the memory card 116, and read various data (user programs, trace data, and the like) from the memory card 116.

The internal bus controller 122 is an interface for exchanging data with the I/O units 124-1, 124-2, . . . mounted on the control device 100.

The fieldbus controller 118 controls the exchange of data with other devices via the first fieldbus 2. Similarly, the fieldbus controller 120 controls the exchange of data with other devices via the second fieldbus 4.

FIG. 3 shows a configuration example in which the necessary functions are provided by executing the program by the processor 102. However, some or all of the functions provided may be implemented using a dedicated hardware circuit (for example, an application specific integrated circuit (ASIC), a field-programmable gate array (FPGA) or the like). Alternatively, the main part of the control device 100 may be realized using hardware that follows a general-purpose architecture (for example, an industrial personal computer based on a general-purpose personal computer). In this case, a plurality of operating systems (OS) having different purposes may be executed in parallel using the virtualization technology, and necessary applications may be executed on each OS.

b2: Hardware Configuration Example of Support Device 200

Figure 4:
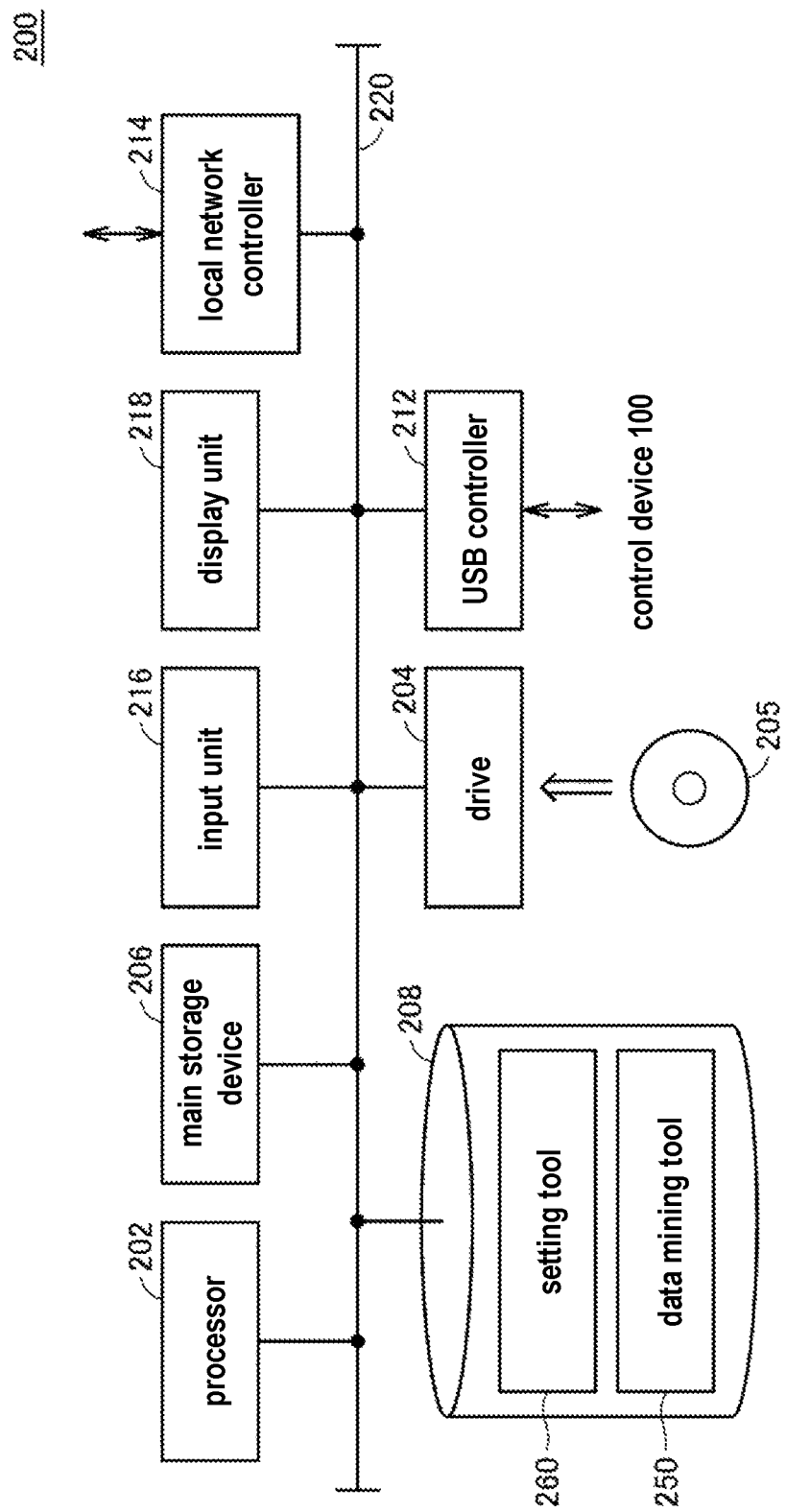
FIG. 4 is a block diagram showing a hardware configuration example of the support device constituting the abnormality detection system according to the present embodiment.

Next, the support device 200 according to the present embodiment is realized, for example, by executing a program, using hardware (for example, a general-purpose personal computer) that follows a general-purpose architecture. FIG. 4 is a block diagram showing a hardware configuration example of the support device 200 that constitutes the abnormality detection system 1 according to the present embodiment. With reference to FIG. 4, the support device 200 includes a processor 202 such as a CPU or an MPU, a drive 204, a main storage device 206, a secondary storage device 208, a USB controller 212, a local network controller 214, an input unit 216, and a display unit 218. These components are connected via a bus 220.

The processor 202 realizes various processing as described below, by reading various programs stored in the secondary storage device 208, deploying and executing the programs in the main storage device 206.

The secondary storage device 208 is made up of, for example, an HDD (Hard Disk Drive), an SSD (Solid State Drive) or the like. The secondary storage device 208 typically stores various programs which includes a development program (not shown) for creating a user program executed by the support device 200, debugging the created program, defining a system configuration, setting various parameters, and the like, a data mining tool 250, and a setting tool 260. The secondary storage device 208 may store the OS and other necessary programs.

The drive 204 is able to write data to the storage medium 205 and read various data (user program, trace data, time series data, or the like) from the storage medium 205. The storage medium 205 includes, for example, a storage medium 205 (for example, an optical storage medium such as a DVD (Digital Versatile Disc)) that temporarily stores a computer-readable program. The program or data stored therein is read from the memory card 116 or the storage medium 205, and installed in an internal storage region such as the secondary storage device 208.

Various programs executed by the support device 200 may be installed via a computer-readable memory card 116 or a storage medium 205, or may be installed in the form of downloading from a server device or the like on the network. Further, in some cases, the function provided by the support device 200 according to the present embodiment may be realized in the form of utilizing a part of the module provided by the OS.

The USB controller 212 controls the exchange of data with the control device 100 via the USB connection. The local network controller 214 controls the exchange of data with other devices via an arbitrary network.

The input unit 216 is made up of a keyboard, a mouse, and the like, and accepts the user manipulations. The display unit 218 is made up of a display, various indicators, and the like, and outputs a processing result and the like from the processor 202. A printer may be connected to the support device 200.

Although FIG. 4 shows a configuration example in which the necessary functions are provided by executing the program by the processor 202, some or all of the functions provided may be implemented using a dedicated hardware circuit (for example, an ASIC, an FPGA or the like).

C. Software Configuration Example/Function Configuration Example

Next, a software configuration example and a functional configuration example of the main devices constituting the abnormality detection system 1 according to the present embodiment will be described.

Figure 5:
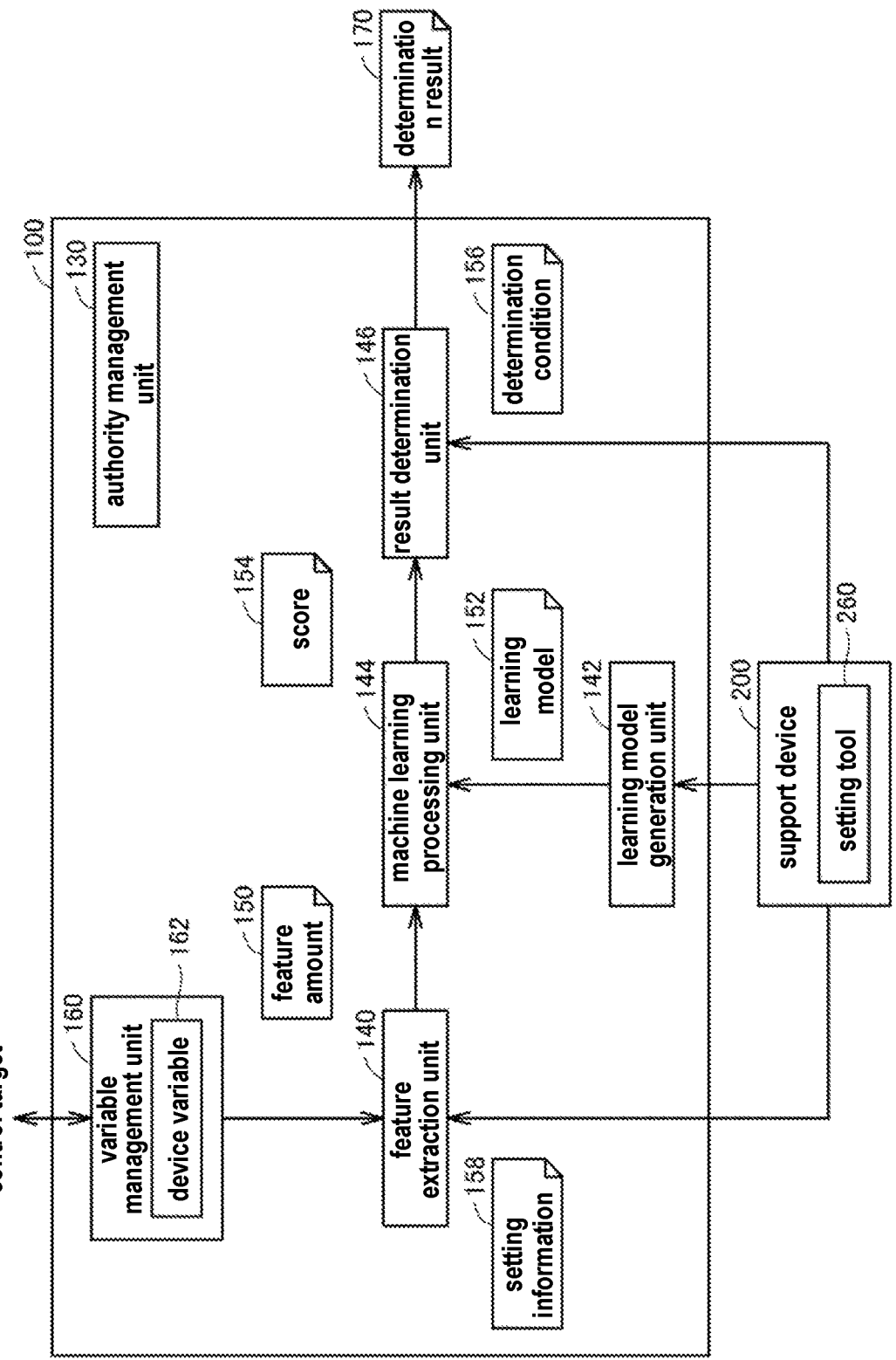
FIG. 5 is a block diagram showing a basic software configuration example of an abnormality detection system according to the present embodiment.

FIG. 5 is a block diagram showing a basic software configuration example of the abnormality detection system 1 according to the present embodiment. With reference to FIG. 5, in the abnormality detection system 1, the control device 100 executes the abnormality detection processing, based on various types of information provided by the support device 200.

The control device 100 includes a variable management unit 160, a feature extraction unit 140, a learning model generation unit 142, a machine learning processing unit 144, a result determination unit 146, and an authority management unit 130.

The variable management unit 160 acquires a state value (input value) appearing in a control target such as a machine or a device for each predetermined control cycle, and updates the internal state value. Further, the variable management unit 160 updates the command value (output value) calculated by the execution of the user program or the like for each control cycle. That is, the variable management unit 160 executes at least a part of the processing related to the I/O refresh processing, and updates the input value acquired from the control target and the output value given to the control target for each control cycle.

In the control device 100 according to the present embodiment, a form of referring in the form of "variables" is adopted for any of the state value (input value) acquired from the control target, the command value (output value) given to the control target, and the data or values (all included in "internal state values") used for the arithmetic processing in the control device 100 or the state management of the control device 100. Therefore, in the following description, the values available in the control device 100 may be expressed as "variable values". Further, a set of internal state values indicating the state values generated in a control target such as a machine or a device is expressed as a "device variable".

The present invention is not restricted to the form of referring the value using the "variable", but is also applicable to a form of directly designating and referring a physical address of a memory for storing each value.

The feature extraction unit 140 calculates one or a plurality of feature amounts 150 from one or a plurality of state values acquired from the monitoring target. More specifically, the feature extraction unit 140 calculates the one or the plurality of feature amounts 150 (for example, an average value, a maximum value, a minimum value, or the like over a predetermined time) periodically or for each event according to a predetermined processing, from the value (a temporal change of the unit interval) indicated by one or a plurality of device variables 162 (state values) of the specified target, according to the setting information 158 set by the support device 200. The unit interval used by the feature extraction unit 140 to calculate the feature amount 150 is also referred to as "frame" below. The unit interval (frame) is arbitrarily set depending on the operation of the monitoring target.

The machine learning processing unit 144 calculates a certain score 154 which is a value indicating a possibility that any abnormality has occurred in the monitoring target, based on the one or the plurality of feature amounts 150 calculated by the feature extraction unit 140, by referring to the learning model 152. Typically, the learning model 152 is provided by the learning model generator 142.

As an example, the machine learning processing unit 144 adopts a method of calculating a score corresponding to the input value, based on the degree of deviation of the input value with respect to a value group in a hyperspace, as an algorithm of the abnormality detection. As methods of abnormality detection based on the degree of deviation, a method of detecting abnormality based on the shortest distance from each point to the value group (k-nearest neighbours algorithm), a local outlier factor method that evaluates the distance including the cluster including the value group (LoF: local outlier factor), an iForest (isolation forest) method of using a score calculated from the path length, and the like are known.

When the learning model 152 is made up of feature amounts at the time of normality, it is possible to determine that the greater the degree of deviation from the learning model 152 (that is, the score) is, the higher the possibility that any abnormality has occurred in the monitoring target is. On the other hand, when the learning model 152 is made up of feature amounts at the time of abnormality, it is possible to determine that the smaller the degree of deviation from the learning model 152 (that is, the score) is, the higher the possibility that any abnormality has occurred in the monitoring target is.

The learning model generation unit 142 generates the learning model 152 according to the instruction from the support device 200. The learning model generation unit 142 may be provided in a part of the support device 200. In this case, the learning model 152 itself is provided from the support device 200 to the control device 100. More specifically, the learning model 152 may be generated, by extracting necessary data, using the data mining tool 250 of the support device 200.

The result determination unit 146 generates a determination result 170 indicating whether any abnormality has occurred in the monitoring target based on the score 154 calculated by the machine learning processing unit 144. The determination condition 156 may be set by the support device 200. Typically, the determination condition 156 includes a threshold range which is set for the score 154 and indicates that there is a high possibility that any abnormality has occurred in the monitoring target.

By adopting the aforementioned configuration, it is possible to detect any abnormality that may occur in any monitoring target included in the control target.

The authority management unit 130 provides a function of restricting an access to software modules, programs, and the like mounted on the control device 100. Details of the authority management unit 130 will be described later.

On the other hand, the support device 200 sets the setting information 158 and the determination condition 156 for the control device 100. More specifically, the support device 200 has a setting tool 260, and the setting tool 260 is in charge of setting processing of various data to the control device 100.

D. Problems and Solving Means

Next, the problems assumed by the abnormality detection system 1 according to the present embodiment and the solving means thereof will be described.

As shown in FIG. 5 described above, in the abnormality detection system 1 according to the present embodiment, the feature extraction unit 140, the learning model generation unit 142, and the machine learning processing unit 144 are mounted on the control device 100 in relation to the abnormality detection processing.

For the processing unit related to abnormality detection processing, the change or confirmation of the definition contents by anyone other than a user who has received a predetermined authority is prohibited. The prohibition of such a manipulation is for maintaining the operation of the abnormality detection system 1 at a constant state and protecting the operation state as know-how, and is managed by the authority management unit 130. More specifically, the authority management unit 130 associates with the setting tool 260 of the support device 200 to thereby manage manipulations on the feature extraction unit 140, the learning model generation unit 142, and the machine learning processing unit 144 using a password or the like.

Figure 6:
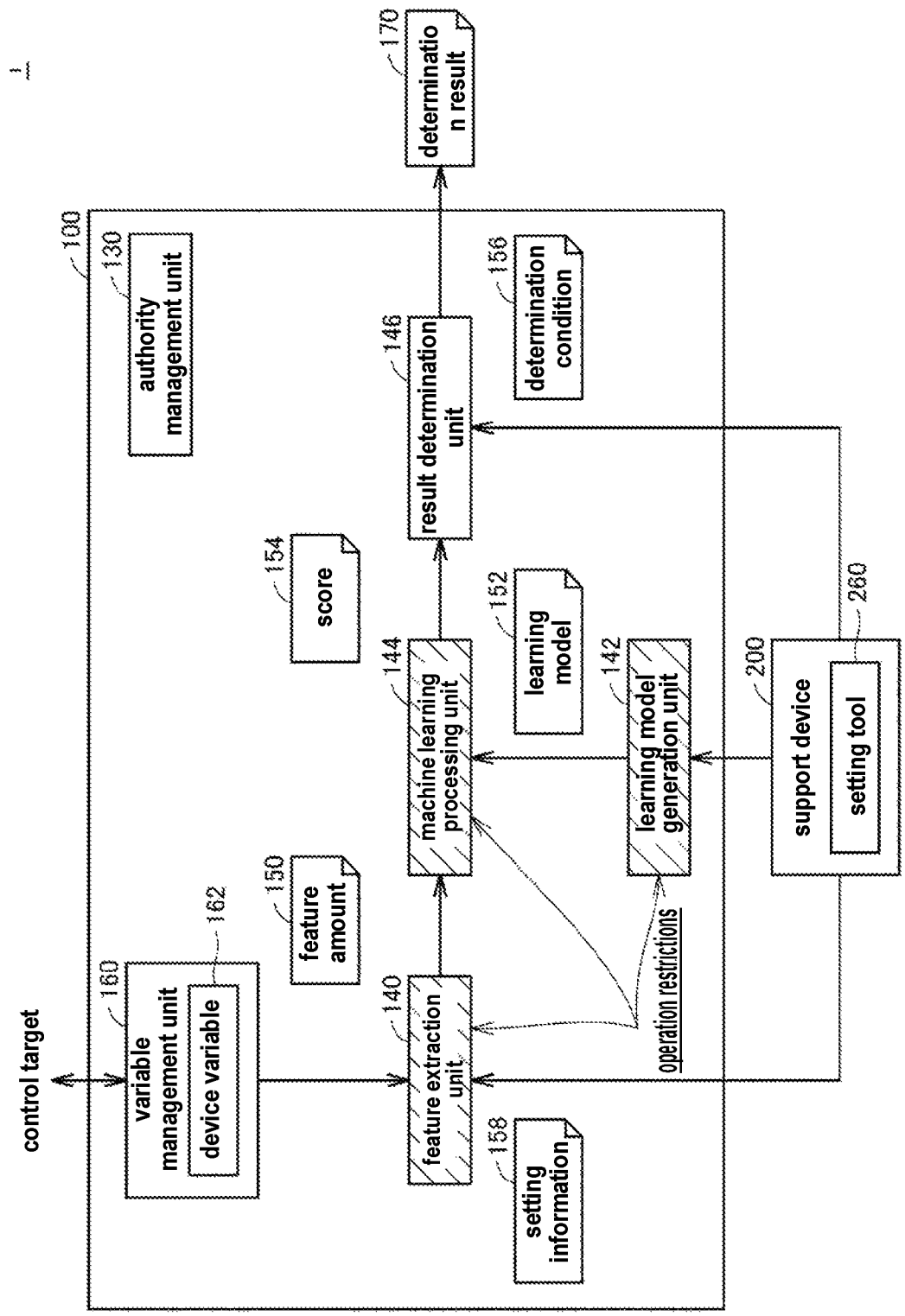
FIG. 6 is a schematic diagram showing a range of operation restrictions set for the software configuration example shown in FIG. 5.

FIG. 6 is a schematic diagram showing a range of operation restrictions which are set for the software configuration example shown in FIG. 5. Referring to FIG. 6, the authority management unit 130 restricts the manipulations on the feature extraction unit 140, the learning model generation unit 142, and the machine learning processing unit 144. That is, the authority management unit 130 restricts access to the programs for realizing the feature extraction unit 140, the learning model generation unit 142, and the machine learning processing unit 144. As a result, it is possible to conceal know-how such as definition contents which are set in the feature extraction unit 140, the learning model generation unit 142, and the machine learning processing unit 144.

On the other hand, it is also necessary to evaluate the validity of the abnormality detection processing (that is, whether it is properly executed). In this case, it is necessary to confirm various data (for example, the feature amount 150 and the score 154) calculated or generated in the abnormality detection processing. When referring to such various data, it is easy to infer the definition contents in the abnormality detection processing, and there is also a possibility that the know-how cannot be sufficiently concealed.

Further, the control device 100 may also be equipped with a function of collecting time series data by data logging or the like to evaluate whether the control calculation is properly executed. It is also possible to infer the definition contents in the abnormality detection processing, by analyzing the time series data of the internal state values which are collected using such a data logging function and held by the control device 100. In such a case, there is also a possibility that the know-how may not be sufficiently concealed as described above.

As described above, there are two conflicting problems in terms of concealment of know-how and easiness of validation, and the abnormality detection system 1 according to the present embodiment can solve these two problems. That is, the abnormality detection system 1 according to the present embodiment provides a configuration having merits to not only the software related to the abnormality detection processing, but also a provider of the know-how related to the abnormality detection processing (that is, a settlor of the definition contents) and a beneficiary of the abnormality detection processing.

Figure 7:
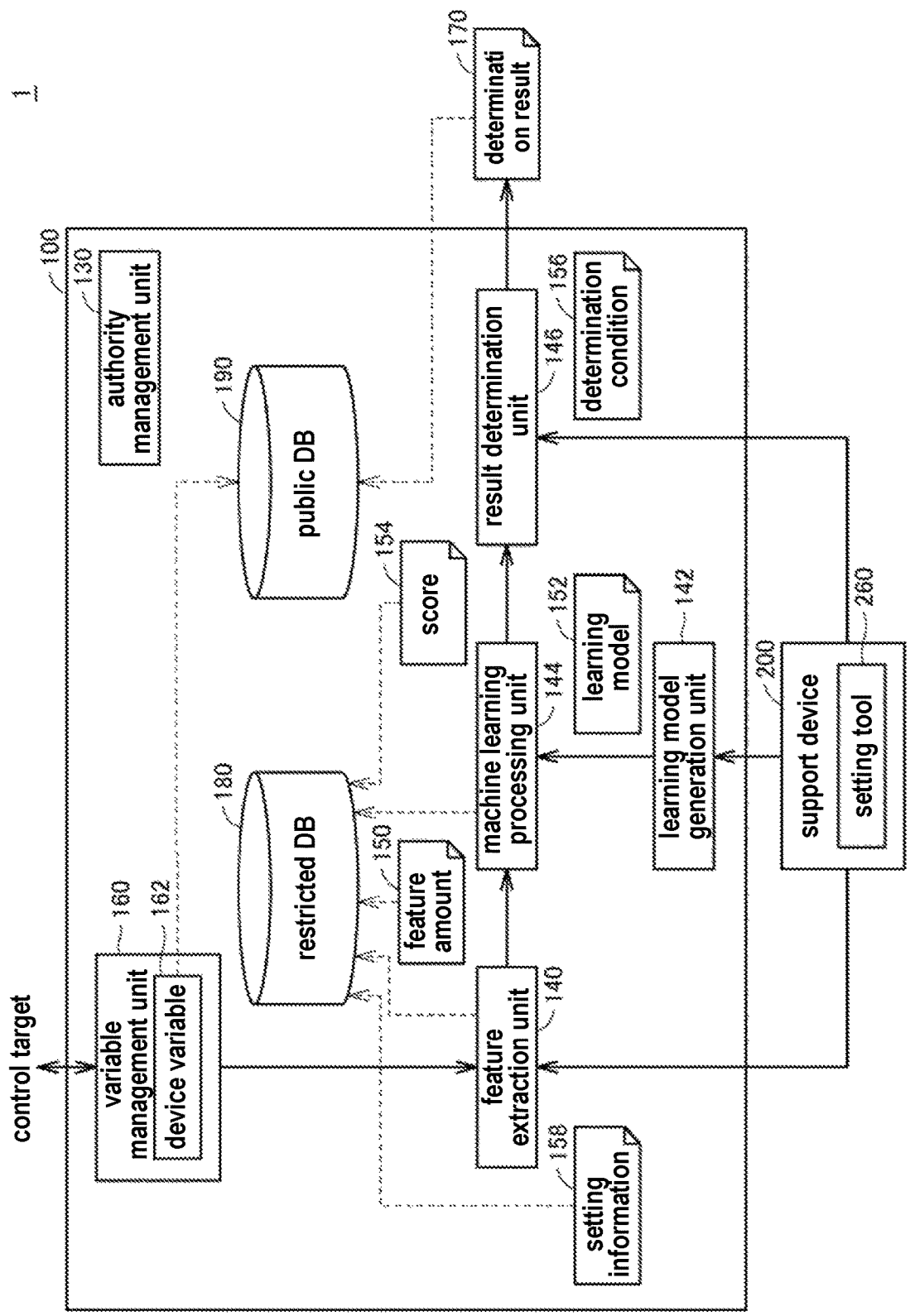
FIG. 7 is a block diagram showing a more detailed software configuration example of the abnormality detection system according to the present embodiment.

FIG. 7 is a block diagram showing a more detailed software configuration example of the abnormality detection system 1 according to the present embodiment. Referring to FIG. 7, the control device 100 has two types of databases for storing various data. Specifically, the control device 100 includes a restricted database (hereinafter, also abbreviated as "restricted DB") 180 in which an access is restricted by the authority management unit 130, and a public database (hereinafter, also abbreviated as "public DB") 190 in which an access is not restricted).

That is, in the abnormality detection system 1 according to the present embodiment, the data related to the know-how of the abnormality detection processing is stored in the restricted DB 180, and the data necessary for using the result of the abnormality detection processing is stored in the public DB 190. By implementing two types of databases having different roles in this way, it is possible to simultaneously solve two conflicting problems in terms of concealment of know-how and easiness of validation.

The restricted DB 180 stores data related to know-how of the abnormality detection processing. That is, the restricted DB 180 is a data storage unit that stores at least one of the data related to the processing in the feature extraction unit 140 and the data related to the processing in the machine learning processing unit 144. More specifically, the restricted DB 180 stores the time information, the frame identification information, the feature amounts, the scores, and the like. This information is basically stored in the form of time series data. Further, the restricted DB 180 may store the contents of the setting information 158 that is set from the support device 200 (what kind of feature amount is calculated from which variable). This information is stored as static information in a table format.

FIG. 8 is a schematic diagram showing an example of data stored in the restricted DB 180 of the control device 100 shown in FIG. 7. The time series data 182 shown in (a) of FIG. 8 and the setting data 184 shown in (b) of FIG. 8 are stored in the restricted DB 180.

The time series data 182 shown in (a) of FIG. 8 includes data which are sequentially generated by executing the feature extraction unit 140, the learning model generation unit 142, the machine learning processing unit 144, the result determination unit 146, and the like. More specifically, the time series data 182 includes an index 1821, a time stamp 1822, a frame ID 1823, a feature amount 1824, and a score 1825.

The index 1821 is information for specifying each record, and is a unique value that is arbitrarily given by the control device 100. Typically, the index 1801 is incremented or decremented for each collection cycle. It is possible to determine presence or absence of lack of data, by using the value to be incremented or decremented.

The time stamp 1822 is time information indicating the timing at which each record is generated. The time information is provided by a time counting means managed by the control device 100.

The frame ID 1823 is identification information for specifying the unit interval (frame) at which the data used for generating each record is collected. Typically, the values of device variables used to determine the frame are stored.

The feature amount 1824 stores the value of the feature amount 150 sequentially calculated by the feature extraction unit 140. That is, the data related to the processing in the feature extraction unit 140 stored in the restricted DB 180 includes the one or the plurality of feature amounts 150 calculated by the feature extraction unit 140.

The score 1825 stores the value of the score 154 sequentially calculated by the machine learning processing unit 144. That is, the data related to the processing in the feature extraction unit 140 stored in the restricted DB 180 includes the score 154 calculated by the machine learning processing unit 144.

Further, the setting data 184 shown in (b) of FIG. 8 describes the contents of the setting information 158 set for the feature extraction unit 140 by the support device 200. More specifically, the setting data 184 includes a feature amount ID 1841, a device variable 1842, and a feature amount type 1843.

The feature amount ID 1841 is identification information for specifying the feature amount calculated by the feature extraction unit 140. The device variable 1842 stores information that identifies the device variable used for calculating the corresponding feature amount. The feature amount type 1843 stores information for specifying the calculating method of the corresponding feature amount.

As described above, the data related to the processing in the feature extraction unit 140 stored in the restricted DB 180 includes the setting information 158.

On the other hand, the public DB 190 stores arbitrary data other than the data related to the know-how of abnormality detection processing. That is, the public DB 190 is a data storage unit that stores an arbitrary state value that can be referred to by the control device 100.

FIG. 9 is a schematic diagram showing an example of data stored in the public DB 190 of the control device 100 shown in FIG. 7. The time series data 192 shown in FIG. 9 is stored in the public DB 190.

Basically, the values updated for each control cycle (I/O refresh processing cycle) of one or a plurality of device variables 162 (state values) managed by the variable management unit 160 are sequentially stored in the time series data 192. More specifically, the time series data 192 includes an index 1921, a time stamp 1922, and a device variable 1923.

The index 1921 is information for specifying each record, and is a unique value arbitrarily given in the control device 100. Typically, the index 1901 is incremented or decremented for each collection cycle. By using the value to be incremented or decremented, it is possible to determine presence or absence of lack of data. Moreover, the same value as the index 1821 may be used for the time series data 182 of (a) of FIG. 8, or a value set independently for each time series data may be used.

The time stamp 1922 is time information indicating the timing at which each record is generated. The time information is provided by a time counting means managed by the control device 100.

The device variable 1923 stores the values of one or a plurality of device variables 162 which are arbitrarily set.

The data items shown in FIGS. 8 and 9 are examples, and data items other than the data items shown may be stored, or another data item may be stored in place of some data items. For example, the public DB 190 may further store the determination result 170 generated by the result determination unit 146.

As described above, the data related to the know-how of abnormality detection processing is stored only in the restricted DB 180, but is not stored in the public DB 190. On the other hand, the data necessary for using the result of the abnormality detection processing (basically, it is not directly related to the know-how of the abnormality detection processing) is stored in the public DB 190.

E. Access to Restricted DB 180

Next, an access method to the restricted DB 180 will be described.

As described above, the access to the data stored in the restricted DB 180 of the control device 100 is restricted to a user who has received a predetermined authority. Further, it is preferable that the data read from the restricted DB 180 of the control device 100 is also securely transmitted. An implementation example for realizing the access restriction to the restricted DB 180 and the secure transmission of read data will be described below.

FIG. 10 is a block diagram showing an implementation example for restricting an access to the restricted DB 180 in the abnormality detection system 1 according to the present embodiment. In FIG. 10, processing of setting the authority for an access to the control device 100 using the setting tool 260 of the support device 200 and accessing the control device 100 from the analysis device 600 by the authorized user is assumed.

As a typical example, the authority management unit 130 determines whether the authority to access the restricted DB 180 is granted, based on the identification information (ID) and the password (Password).

With reference to FIG. 10, as a preliminary preparation, it is assumed that the setting tool 260 of the support device 200 is prepared with a pair of the private key 262 and the public key 264.

First, the administrator user of the abnormality detection system 1 manipulates the setting tool 260 of the support device 200 to set identification information (ID) and the password (Password) for specifying a user who can access the authority management unit 130 of the control device 100 ((1) setting). This setting content is stored in the authority setting table 266.

Subsequently, the administrator user of the abnormality detection system 1 manipulates the setting tool 260 of the support device 200 to set the private key 262 in the authority management unit 130 ((2) provision of private key), and set the public key 264 corresponding to the private key 262 in the analysis device 600 ((3) provision of public key).

By the aforementioned manipulation, processing such as authority setting for the abnormality detection system 1 is completed. In this state, the authority management unit 130 has a private key 262 corresponding to the public key 264 held by the analysis device 600, which is an external device that accesses the restricted DB 180.

After that, a case of accessing the data stored in the restricted DB 180 of the control device 100 from the analysis device 600 is assumed. The user who has received the predetermined authority manipulates the analysis device 600 and inputs the identification information (ID) and password (Password) given to the user. The input identification information (ID) and password (Password) are encrypted by the public key 264 stored in the analysis device 600 and are transmitted to the control device 100 ((4) input ID +Password (encryption by public key)).

The authority management unit 130 of the control device 100 executes processing (authentication processing) of decrypting the identification information (ID) and the password (Password) encrypted by the public key 264 transmitted from the analysis device 600 with the private key 262, and determining whether the authority to access the restricted DB 180 is granted, with reference to the authority setting table 266 ((5) authentication).

When the authority management unit 130 of the control device 100 succeeds in the authentication processing, the authority management unit 130 generates a common key 268 used for transmission of data ((6) common key generation). Further, the authority management unit 130 of the control device 100 transmits the generated common key 268 to the analysis device 600 ((7) common key transmission). That is, when the authority management unit 130 determines that the authority to access the restricted DB 180 is granted, the authority management unit 130 transmits, to the analysis device 600, the common key 268 for encrypting the data exchanged with the analysis device 600.

At the time of transmission of the common key 268, the authority management unit 130 of the control device 100 transmits the common key 268 to the analysis device 600 after encryption using the private key 262. On the other hand, the common key 268 encrypted from the analysis device 600 is decrypted by the public key 264 of the own device.

Finally, the data stored in the restricted DB 180 is transmitted to the analysis device 600 by using the common key 268 which is common between the authority management unit 130 of the control device 100 and the analysis device 600 ((8) data transmission (encryption due to common key)). More specifically, the encryption unit 132 of the authority management unit 130 encrypts the data stored in the restricted DB 180 using the common key 268, and then transmits the data to the analysis device 600. The analysis device 600 decrypts the encrypted data using the common key 268.

The public DB 190 can basically be accessed from any device connected to the control device 100. In this way, the contents of the public DB 190 can be arbitrarily referred to by the user of the control device 100, and meanwhile, the contents of the restricted DB 180 can be referred only to the user to which the predetermined authority is granted.

By adopting such a configuration, it is possible to achieve requirements such as protection of know-how related to abnormality detection processing, evaluation of validity of abnormality detection processing, and verification when any abnormality has occurred.

Further, by adopting an implementation example as shown in FIG. 10, any transmission protocol such as HTTP (hypertext transfer protocol) or FTP (file transfer protocol) can be used.

Although FIG. 10 shows a configuration in which an access from the analysis device 600 connected to the network is accepted for the restricted DB 180 of the control device 100, the present invention is not limited thereto, and only a user having a predetermined authority may take out the data via the memory card 116 that can be attached to the control device 100.

F. Appendix

The present embodiment as described above includes the following technical ideas.
[Configuration 1]
A control device (100) which controls a control target including:
a feature extraction unit (140) which calculates one or a plurality of feature amounts (150) from one or a plurality of state values (164) acquired from a monitoring target; a processing unit (144) which calculates a score (154) that is a value indicating a possibility that any abnormality has occurred in the monitoring target based on the one or the plurality of feature amounts calculated by the feature extraction unit, with reference to a learning model (152);
a determination unit (146) which generates a determination result (170) indicating whether any abnormality has occurred in the monitoring target, based on the score calculated by the processing unit;
a first data storage unit (180) which stores at least one of data related to processing in the feature extraction unit and data related to processing in the processing unit;
a second data storage unit (190) which stores an arbitrary state value capable of being referred to by the control device; and
an authority management unit (130) which restricts access to the first data storage unit.
[Configuration 2]
The control device according to configuration 1, in which the data related to the processing in the feature extraction unit includes the one or the plurality of feature amounts (150) calculated by the feature extraction unit.
[Configuration 3]
The control device according to configuration 1 or 2, in which the feature extraction unit calculates the one or plurality of feature amounts (150) from one or a plurality of state values specified by setting information (158) from outside, and
the data related to the processing in the feature extraction unit includes the setting information.

[Configuration 4]
The control device according to any one of configurations 1 to 3, in which the data related to the processing in the processing unit includes the score (154) calculated by the processing unit.
[Configuration 5]
The control device according to any one of configurations 1 to 4, in which the authority management unit restricts the access to programs for realizing the feature extraction unit and the processing unit.
[Configuration 6]
The control device according to any one of configurations 1 to 5, in which the second data storage unit further stores the determination result (170) generated by the determination unit.
[Configuration 7]
The control device according to any one of the configurations 1 to 6, in which the authority management unit determines whether an authority to access the first data storage unit is granted based on identification information and a password (266).
[Configuration 8]
The control device according to configuration 7, in which the authority management unit has a private key (262) corresponding to a public key (264) held by an external device that accesses the first data storage unit, and
the authority management unit decrypts the identification information and the password encrypted by the public key transmitted from the external device with the private key, and then determines whether the authority to access the first data storage unit is granted.
[Configuration 9]
The control device according to the configuration 8, in which when the authority management unit determines that the authority to access the first data storage unit is granted, the authority management unit transmits, to the external device, a common key (268) for encrypting data exchanged with the external device.

G. Advantages

In the abnormality detection system according to the present embodiment, it is possible to provide a mechanism that can appropriately protect the know-how related to the abnormality detection processing, and can facilitate ex-post analysis processing, by preparing two types of data storage units of the restricted DB 180 in which an access is restricted and the public DB 190 which can be accessed arbitrarily.

Further, in the abnormality detection system according to the present embodiment, since it is possible to realize access restriction using the identification information and the password, and data protection using the public key, the private key, and the common key, a necessary security can be ensured.

The embodiments disclosed this time are exemplary in all respects and are not restrictive. The scope of the present invention is indicated by the claims, not the aforementioned description, and is intended to include all modifications within the meaning and scope equivalent to the claims.

What is claimed is:
1. A control device which controls a control target, comprising:
a first data storage unit, comprising a first memory;
a second data storage unit, comprising a second memory;
a first processor configured to function as:

a feature extraction unit which calculates one or a plurality of feature amounts from one or a plurality of state values acquired from a monitoring target;

a processing unit which calculates a score that is a value indicating a possibility that any abnormality has occurred in the monitoring target, based on the one or the plurality of feature amounts calculated by the feature extraction unit, with reference to a learning model;

a deteimination unit which generates a determination result indicating whether any abnormality has occurred in the monitoring target, based on the score calculated by the processing unit;

an authority management unit which restricts access to the first data storage unit while allowing access to the second data storage unit;

wherein the first data storage unit stores at least one of data related to processing in the feature extraction unit and data related to processing in the processing unit;

wherein the second data storage unit stores an arbitrary state value capable of being referred to by the control device, wherein the second data storage unit further stores the determination result generated by the deteiiiiination unit.

2. The control device according to claim 1, wherein the data related to the processing in the feature extraction unit includes the one or the plurality of feature amounts calculated by the feature extraction unit.

3. The control device according to claim 1, wherein the feature extraction unit calculates the one or plurality of feature amounts from the one or the plurality of state values specified by setting information from a support device comprising a second processor, and the data related to the processing in the feature extraction unit includes the setting information.

4. The control device according to claim 1, wherein the data related to the processing in the processing unit includes the score calculated by the processing unit.

5. The control device according to claim 1, wherein the authority management unit restricts the access to programs for realizing the feature extraction unit and the processing unit.

6. The control device according to claim 1, wherein the authority management unit determines whether an authority to access the first data storage unit is granted based on identification information and a password.

7. The control device according to claim 6, wherein the authority management unit has a private key corresponding to a public key held by an external device that accesses the first data storage unit, and the authority management unit decrypts the identification information and the password encrypted by the public key transmitted from the external device with the private key, and then determines whether the authority to access the first data storage unit is granted.

8. The control device according to claim 7, wherein when the authority management unit determines that the authority to access the first data storage unit is granted, the authority management unit transmits, to the external device, a common key for encrypting data exchanged with the external device.

9. The control device according to claim 2, wherein the feature extraction unit calculates the one or plurality of feature amounts from the one or the plurality of state values specified by setting information from a support device comprising a second processor, and the data related to the processing in the feature extraction unit includes the setting information.

10. The control device according to claim 2, wherein the data related to the processing in the processing unit includes the score calculated by the processing unit.

11. The control device according to claim 2, wherein the authority management unit restricts the access to programs for realizing the feature extraction unit and the processing unit.

12. The control device according to claim 2, wherein the second data storage unit further stores the determination result generated by the determination unit.

13. The control device according to claim 2, wherein the authority management unit determines whether an authority to access the first data storage unit is granted based on identification information and a password.

14. The control device according to claim 13, wherein the authority management unit has a private key corresponding to a public key held by an external device that accesses the first data storage unit, and the authority management unit decrypts the identification information and the password encrypted by the public key transmitted from the external device with the private key, and then determines whether the authority to access the first data storage unit is granted.

15. The control device according to claim 14, wherein when the authority management unit determines that the authority to access the first data storage unit is granted, the authority management unit transmits, to the external device, a common key for encrypting data exchanged with the external device.

* * * * *